April 29, 1941.  F. J. PAUL  2,240,442
CLEANING AND SEPARATING DEVICE
Filed July 18, 1938   2 Sheets-Sheet 1
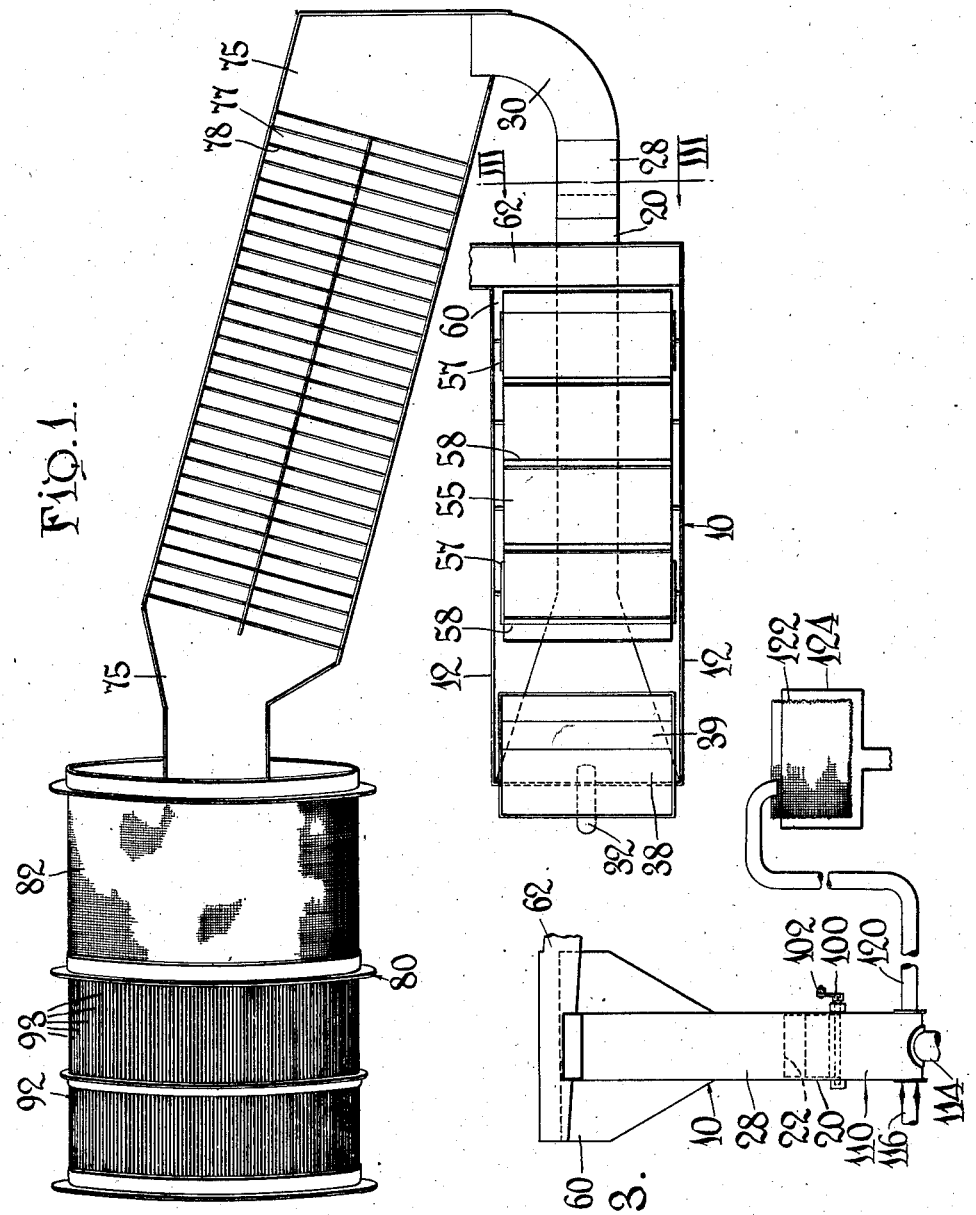
INVENTOR
Frederick J. Paul,
BY
Beau, Brooks, Buckley & Beau.
ATTORNEYS April 29, 1941.  F. J. PAUL  2,240,442
CLEANING AND SEPARATING DEVICE
Filed July 18, 1938   2 Sheets-Sheet 2
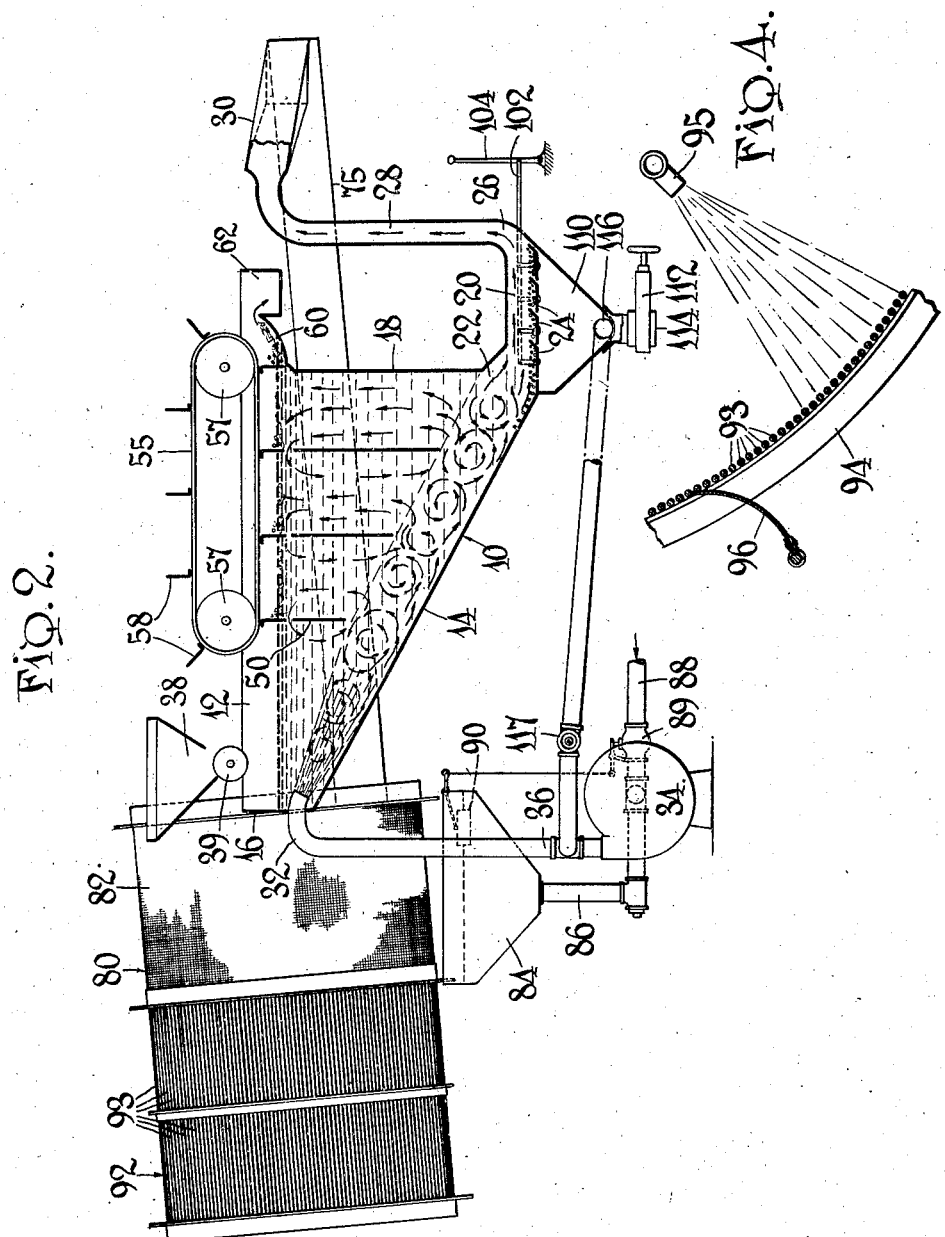
INVENTOR
Frederick J. Paul,
BY
Beau, Brooks, Buckley & Beau.
ATTORNEYS Patented Apr. 29, 1941

2,240,442

UNITED STATES PATENT OFFICE 2,240,442

CLEANING AND SEPARATING DEVICE

Frederick J. Paul, Fredonia, N. Y., assignor to Huntley Manufacturing Co., Brocton, N. Y.

Application July 18, 1938, Serial No. 219,740

5 Claims. (Cl. 209—155)

This invention relates to a method and apparatus for classifying, separating, and cleaning materials such as cereal grains, fruits, vegetables, or the like, and has for its main purpose to provide for more improved and efficient segregation of imperfect products and foreign materials such as hulls, dirt, rodent excreta, stones and other refuse from the good material supplied to the apparatus.

Another object of the invention is to provide an apparatus for the above purpose which is especially adapted for use in connection with the preparation of peas, beans, cereal grains such as corn, wheat, oats, rice, or other produce vegetables and fruits of which the imperfect tend to float in water or other solution and the perfect tend to sink in the same medium.

Another object is to provide an improved method and apparatus for the purpose described which is capable of procuring a more perfect separation of the preferred material from the refuse and in an improved manner.

Another object of the invention is to provide an improved method and apparatus for the purpose described that involves the handling of the preferred portion of the material being treated in an improved and more gentle manner, thus avoiding bruising and other injury thereof.

Another object of the invention is to provide an apparatus for the purpose described that is simple and compact in form, inexpensive to manufacture and durable in use; the moving parts of which are readily accessible for servicing from the exterior thereof.

In the drawings:

Fig. 1 is a diagrammatic plan view of an apparatus employing the principles of the invention;

Fig. 2 is a vertical section taken substantially along line II—II of Fig. 1, and showing portions of the apparatus in elevation;

Fig. 3 is a vertical section taken substantially along line III—III of Fig. 1; and Fig. 4 is a fragmentary section of a portion of the separating mechanism of the apparatus.

In general, the invention contemplates the introduction of the vegetable or other material to be treated in the form of a continuously running stream into a tank of water or other liquid which is of such specific gravity as to float the imperfect and other relatively light weight portions of the feed material such as fragments of shells, hulls, leaves, stems or the like, and to permit the perfect or preferred portions of the feed material to settle and sink therethrough toward the bottom of the tank. The bottom of the tank is arranged to slope downwardly from the point of introduction of the feed material toward a settlement pocket and a flow deflecting outlet conduit which are progressively in open communication therewith. The transportation of the preferred material toward the settlement pocket and the outlet conduit is accomplished by a combination of the forces of gravity and an influx current of the liquid being employed in the tank. The influx is directed along the bottom surface of the tank in its downwardly inclined direction between the bottom wall of the tank and a series of upright partitions or baffles disposed transversely of the direction of flow across the interior of the tank and terminating in spaced relation with respect to the bottom wall of the tank. The partitions extend upwardly to positions slightly below the level of liquid in the tank. The influx current simultaneously keeps the feed material in a state of agitation and urges it through the space between the bottom of the tank and the partitions toward the settlement pocket and the outlet conduit. During this agitation and transportation process the imperfect vegetable or fruit and other light refuse substances are enabled to escape from the mass of feed material and to float upwardly through the liquid between the partitions and to float adjacent the top surface of the liquid from which they are removed by a skimming device.

Upon entering the flow deflecting conduit the exceptionally heavy portions of the feed material, such as pebbles, dirt, or other heavy foreign matter are segregated from the preferred portions of the feed material because of their relative specific gravities and the centrifuging action set up by the deviation in the direction of flow toward the outlet conduit. Hence, the heavy foreign materials accumulate upon the bottom surface of the settlement pocket, and are periodically removed therefrom by means of a special dumping device which effectively removes the foreign material without appreciable loss of or injury to the preferred product. The preferred material flows through the outlet conduit under the hydraulic force of the influx current and is conveyed to a dewatering device from which it may be conveyed to further treating and/or packaging equipment. The water, or other liquid whichever the case may be, recovered from the dewatering device is pumped back into the system, preferably in the form of the influx current, thus minimizing the amount of water or liquid required for operation of the system.

Throughout the entire classifying and washing operation the preferred portions of the feed material are conveyed through the apparatus in substantially liquid-sustained state through action of the buoyancy and dynamic forces of the fluid stream and without coming in contact with moving mechanical parts which might otherwise subject the material to bruising and breaking or other injury.

In the drawings, an apparatus employing the principles of the invention is shown as comprising a tank 10 having side walls 12 and a sloping bottom wall 14 extending between end walls 16 and 18. A settlement pocket 20 is disposed adjacent the inter-section of the bottom wall 14 and the end wall 18, and is in open communication with a port 22 therethrough. A series of horizontally pivoted plates 24 are arranged to extend in butting relation across the settlement pocket in spaced relation with the top thereof to provide therebetween a passageway for the finished product. The line of the plates 24 is substantially in continuation of the bottom wall 14 of the tank but is in a slightly angular relation therewith, being disposed in a substantially horizontal plane. The plates 24 are preferably formed with upwardly inclined rear terminal edge portions as shown to provide the effect of a riffle board construction whereby the stones and other heavy foreign substances of the feed may fall into the pocket-like spaces behind the upturned portions of the plates and remain therein in relatively undisturbed relation until they are dumped as will be explained hereinafter. At the opposite end of the settlement pocket a 90° elbow 26 connects the pocket 20 with a vertically disposed outlet conduit 28 which extends upwardly therefrom and is arranged to discharge at an elevation just slightly below the elevation of the level of liquid in the tank, and into a launder 30.

A nozzle 32 for directing an influx of liquid into the tank and downwardly along the bottom surface thereof is provided adjacent the end wall 16 and is adapted to direct a flow of liquid under pressure produced by a pump 34 and through a conduit 36 into the tank. A feed material inlet hopper 38 is provided adjacent the end wall 16 of the tank for directing material fed to the apparatus into the liquid influx stream thereof adjacent the location of the nozzle 32. Preferably, a roll 39, or some other form of uniform feeding device is employed in conjunction with the hopper 38 to arrange for smoothing out the rate of feed flow into the apparatus. A series of vertically spaced partition members 50 extending transversely of the direction of the influx current are mounted upon and extend between the opposing side walls 12, and are so proportioned as to terminate uniformly at their upper ends a short distance below the level of liquid in the tank and at their bottom ends at equal distances from the bottom plate 14 to provide therebetween an open passageway for flow from the region of the nozzle 32 to the settlement pocket 20.

A skimming device is illustrated herein as comprising an endless chain 55 mounted to revolve about a pair of spaced pulleys 57, to one of which is applied power to operate the device. The belt 55 carries a series of spaced sweeps 58 extending laterally thereof and adapted to extend a slight distance downwardly into the liquid in the tank 10 but to clear the upper ends of the partitions 50. The upper end of the end wall 18 is provided with a laterally extending and upwardly sloping curved apron 60, the body portion of which is concentric with the axis of the adjacent pulley 57 and so spaced therefrom that the sweeps 58 are adapted to move upwardly thereon with a free-moving scraping action.

When peas or beans or other vegetables or fruits are introduced through the hopper 38 in a continuously moving stream and the nozzle is opened to direct an influx current into the tank, the current immediately picks up the feed material with a churning action, as illustrated in Fig. 2, and commences to transport it downwardly along the bottom plate 14 of the tank. As the churning and transporting action proceeds the relatively light-weight imperfect peas or beans or other undesirable material such as skins or hulls or other light foreign substances find ample opportunity to work their way through the mass of feed material and upwardly into one of the spaces between the partition members in response to the buoyancy force of the liquid.

Also, because the fluid travel spaces below the partitions 50 and through the port 22 tend to restrict the movement of the hydraulic stream a partial diversion of the fluid stream upwardly through the tank between the partitions 50 is produced. As illustrated in Fig. 1, the diverted portions of the fluid stream move upwardly adjacent one side of the partitions and across the top edges thereof and thence downwardly adjacent their opposite sides, thus setting up an intermediate circulatory fluid stream portion. The rate of motion of the upwardly moving portion of the circulatory stream is not sufficient to carry the perfect peas or beans or products to within range of the sweeps 58, but the downwardly moving portions of the circulatory fluid streams interject themselves into the major material transporting fluid stream and thus insure complete and continued agitation thereof. Heavier portions of the feed material including the preferred substances and still heavier foreign materials such as stones, dirt, or the like, proceed downwardly for the full length of the bottom plate 14 and into the settlement chamber 20. Due to the particular arrangement for changing the direction of flow at the entrance and exit of the settlement chamber, the forces of centrifugal action combine with the gravity segregating forces previously acting upon the mixture of preferred materials and the relatively heavier foreign materials to cause the foreign materials to accumulate against the plates 24. The interior of the body of the settlement chamber 20 is relatively restricted in sectional areas to compared to the passageway provided for the flow through the body of the tank 10, and consequently the lighter and preferred portions of the feed material reaching the settlement pocket are moved through the pocket at an increased velocity and lifted through the outlet conduit 28 into the trough 30.

The trough 30 may be arranged to lead the product of the washer-classifier to further treating apparatus such as into the upper end of an inclined chute 75 which, as shown in Fig. 1 may be provided with one or more liner trays 77 equipped with upstanding cleats 78 extending transversely of the direction of flow along the trays. Thus, an additional means of segregating relatively heavy foreign particles from the product may be provided, the cleats 78 providing settlement pockets adjacent the surface of the trays according to the well known principles of "riffle board" devices.

Whenever the settlement pockets become filled with refuse material the trays may be removed from the chute and their contents dumped before being replaced again to continue the operation. The lower end of the inclined chute 75 is arranged to discharge the product into the interior of the upper end of an inclined cylindrical dewatering and cleaning device 80 which is continuously rotated about its longitudinal axis by any suitable power means (not shown). The device 80 is provided with a first section 82 of perforated wall form, the perforations being either rectangular or circular in form and sufficiently small in size to prevent egress therethrough of the product being treated. Thus, the section 82 constitutes a dewatering device for draining a large proportion of the water or other solution being employed in the system from the product. The drainage is caught in a secondary tank 84 disposed below the screen, an outlet from which leads by way of a pipe or other conduit 86 to the inlet port of the pump 34. Hence, a substantially closed liquid system is provided whereby the solution drained from the product is returned to the feed-in-end of the apparatus in the form of the influx jet. The slight loss of solution occasioned by carriage over by the product past the drainage section 82 and other sources of loss such as leakage, evaporation, etc., may be compensated for by the introduction of fresh solution, as required, as through the inlet 88 from an outside source of water or fluid supply. The control of the additional flow through the inlet 88 may be automatically effected in accord with the state of the level of liquid in the secondary tank 84 as by means of a valve 89 in the line of the conduit 88 which is controlled by a float 90 in the secondary tank 84.

The cylinder 80 is formed with a second section 92 adjacent the section 82 which is made up of spaced parallel rods 93, (Figs. 2 and 4) so as to provide slot shaped openings therebetween, the slots being disposed with their long axes extending parallel to the longitudinal axis of the screen. These slots are so proportioned and dimensioned as to enable relatively thin and flat shaped particles such as bits of shells or hulls or splits or leaves to pass therethrough while at the same time preventing loss of the prepared peas or beans or other product being treated which pass out of the discharge end of the cylinder into a hopper or other suitable means for conveying it to the packaging or other handling device to be employed (not shown).

As shown in Fig. 4, the rods 93 of the cleaning section 92 are preferably mounted upon their supporting frame structure in such manner as to avoid interference thereby with the ready passage of the finished product to the point of outlet from the cylinder. To this end the girthwise portion 94 of the frame is shown submerged below the inner wall line of the rods 93, as by mounting the rods 93 thereon in simple lapped relation and connecting the parts by welding or soldering or the like. Thus, the frame portion 94 is prevented from acting as a dam or otherwise interfering with the free movement of product through the cylinder 80. If desired, a spray 95 of fresh water may be applied to the finished product as it moves through the cylinder 80, to provide a final rinsing and cleaning of the product. The rinse water may be caught in the tank 84 and any other suitable means and forwarded into the circulating fluid system of the apparatus for water economy purposes.

To prevent the openings between the rods 93 from becoming clogged with produce I provide a slapper 96 of resilient plate form, such as of a piece of belting, one end of which is rigidly mounted upon some convenient stationary portion of the apparatus frame in such manner that the other end thereof is normally pressed into inclined engagement with the rods of the cylinder. Consequently, when the cylinder is revolving during operation of the apparatus the free end of the slapper 96 will press successively against the respective rod members of the cylinder as they come about into contact therewith. Because of the inclined attitude of pressure contact between the slapper 96 and each successive rod 93, the rod portions intermediate of their supported ends are temporarily sprung rearwardly of their directions of travel and away from the preceding rod portion. Consequently the openings between the adjacent rod members are periodically widened beyond their normal spacing simultaneously with the application of a slapping force upon the rod system, and any accumulations of produce between the rods are thus dislodged.

By virtue of the arrangement shown, wherein the washer-classifier and the tray classifier and dehydrator and cleaner are arranged in substantially parallel and close coupled relation, a complete apparatus of compact form adapted to be mounted upon a single compact base structure is provided. By reason of the employment of a combination of hydraulic and gravity forces for the classification and segregation and transportation processes of the method, a minimum amount of power is required to operate the apparatus, and injurious handling of the product is avoided while a more efficient and accurate classification and segregation of the preferred product and the refuse materials of the feed in the presence of a close margin of specific gravity differences will be obtained.

As illustrated in Figs. 1 and 3, the refuse receiving plates 24 may be provided with offset crank arms 100 which are pivotally connected at their upper ends to a push-pull link 102. Means for shifting the link 102 may be provided, as in the form of a lever 104 so that the plates 24 may be rocked about their pivotal axes to dump the accumulated heavy refuse materials as may be required to keep the passageway 20 open for movement of the finished product therethrough. Thus, the outer peripheral wall portion of the curving conduit receiving the mixture of preferred product and relatively heavier refuse at the discharge end of the tank 10 is provided with tiltable shutter means for the periodical release of accumulations of stones thereon. A hopper 110 may be arranged beneath the plates 24 to receive the refuse material when dumped therefrom and to provide a fluid-tight closure for the bottom of the tank 10. A gate valve 112 may be disposed in the line of an outlet conduit 114 leading from the hopper 110 so that the contents of the hopper may be periodically removed while the plates 24 are in their operative positions. Thus, provision is made for removal of the heavy refuse substances without loss of substantial quantities of the solution employed in the system. An alternate form of stone removal means is also shown in Fig. 3, wherein a conduit 116 for conveying wash water under pressure transversely of the stone hopper 110 is provided. Flow of water through the conduit 116 is controlled by a suitable valve 117 and an outlet conduit 120 is arranged to carry the stones to a point of discharge into a wire drainage basket 122 which rests in a drainage tank 124. The basket and tank 124 are preferably located at an elevated position so that the fluid drained therefrom may be conveyed by gravity to a point of entrance into the fluid system of the apparatus. The stone retaining basket 122 is arranged to be periodically lifted out of the tank 124 and dumped of its contents.

Although only one form of the invention has been shown and described in detail, it will be apparent to those skilled in the art that the invention is not so limited but that various changes may be made therein without departing from the spirit of the invention or from the scope of the appended claims.

I claim:

1. A method of separating vegetable produce or the like from mixture containing refuse materials of specific gravities both greater and lesser than the specific gravity of said produce including the steps of delivering the produce and refuse mixture into a liquid in a container, said liquid being of a specific gravity greater than the specific gravity of the lighter of said refuse materials, agitating said mixture in said liquid whereby said lighter refuse material are released from said mixture and rise to the surface of said liquid while transporting said produce and heavier refuse materials by means of a current of liquid directed first downwardly and then into a vertically curvilinear path leading upwardly toward a point of produce discharge, whereby the heavier of said refuse materials are centrifugally separated from said produce, and segregating said centrifugally separated heavy refuse materials from said produce in the region of said curvilinear path.

2. A method of separating vegetable produce or the like from mixtures containing refuse materials of specific gravities both greater and lesser than the specific gravity of said produce including the steps of delivering the produce and refuse mixture into a liquid in a container, said liquid being of a specific gravity greater than the specific gravity of the lighter of said refuse materials, agitating said mixture in said liquid whereby said lighter refuse materials are released from said mixture and rise to the surface of said liquid while transporting said produce and heavier refuse materials by means of a current of liquid directly first downwardly and then through a vertically curvilinear path leading upwardly toward a point of produce discharge, whereby the heavier of said refuse materials are centrifugally and gravitationally separated from said produce during movement through said curvilinear path, and segregating said centrifugally separated heavy refuse materials from said produce in the region of said curvilinear path.

3. An apparatus for separating farm produce or the like from mixtures containing refuse materials of specific gravities both greater and lesser than the specific gravity of said produce, said apparatus including a relatively deep liquid container having a bottom wall portion sloping at a substantial angle downwardly from one end of said container, said container having a plurality of vertical partitions disposed transversely of the interior thereof and terminating at their upper ends in a horizontal plane below the upper end of said container and terminating at their lower ends in spaced relation with respect to said sloping bottom wall portion so as to define therebetween an unobstructed fluid passageway of substantial sectional area for movement of produce mixtures therethrough, a liquid inlet jet device disposed adjacent the upper end of said sloping bottom wall portion for directing a stream of liquid downwardly along said sloping wall portion and below said partition members, a horizontally extending conduit in open communication at one of its ends with the interior of said container adjacent the lowermost portion of said sloping bottom wall and extending therefrom into communication with a vertically curving conduit leading into a vertically extending produce discharge conduit having its discharge portion disposed at approximately the level of liquid in said container when said liquid fills said container to a level slightly above the line of the upper end portions of said partitions, said horizontally extending and vertically curving conduits being of relatively constricted sectional areas with respect to the sectional area of the passageway defined between said sloping bottom wall and said partitions, riffle means disposed transversely across the bottom portion of said horizontally extending conduit for collection of heavy refuse material thereon, means for periodically discharging said collected heavy refuse from said riffle means externally of the apparatus, and light refuse skimming means mounted upon the upper portion of said container for skimming off the refuse materials floating at the top surface of the liquid within said container.

4. An apparatus for separating farm produce or the like from mixtures containing refuse materials of specific gravities both greater and lesser than the specific gravity of said produce, said apparatus including a relatively deep liquid container having a bottom wall portion sloping at a substantial angle downwardly from one end of said container, said container having a plurality of vertical partitions disposed transversely of the interior thereof and terminating at their upper ends in a horizontal plane below the upper end of said container and terminating at their lower ends in spaced relation with respect to said sloping bottom wall portion so as to define therebetween an unobstructed fluid passageway of substantial sectional area for movement of produce mixtures therethrough, a liquid inlet jet device disposed adjacent the upper end of said sloping bottom wall portion for directing a stream of liquid downwardly along said sloping wall portion and below said partition members, a conduit in open communication at one of its ends with the interior of said container adjacent the lowermost portion of said sloping bottom wall and curving therefrom into communication with a vertically extending produce discharge conduit having its discharge portion disposed at approximately the level of liquid in said container when said liquid fills said container to a level slightly above the line of the upper end portions of said partitions, said curving conduits being of relatively constricted sectional areas with respect to the sectional area of the passageway defined between said sloping bottom wall and said partitions, riffle means disposed transversely across the bottom portion of said horizontally disposed conduit for collection of heavy refuse materials thereon, means for periodically discharging said collected heavy refuse from said riffle means externally of the apparatus, and light refuse skimming means mounted upon the upper portion of said container for skimming off the refuse materials floating at the top surface of the liquid within said container.

5. An apparatus for separating farm produce or the like from mixtures containing refuse materials of specific gravities both greater and lesser than the specific gravity of said produce, said apparatus including a relatively deep liquid container having a bottom wall portion sloping at a substantial angle downwardly from one end of said container, said container having a plurality of vertical partitions disposed transversely of the interior thereof and terminating at their upper ends in a horizontal plane below the upper end of said container and terminating at their lower ends in spaced relation with respect to said sloping bottom wall portion so as to define therebetween an unobstructed fluid passageway of substantial sectional area for movement of produce mixtures therethrough, a liquid inlet jet device disposed adjacent the upper end of said sloping bottom wall portion for directing a stream of liquid downwardly along said sloping wall portion and below said partition members, a conduit in open communication at one of its ends with the interior of said container adjacent the lowermost portion of said sloping bottom wall and curving therefrom into communication with a vertically extending produce discharge conduit having its discharge portion disposed at approximately the level of liquid in said container when said liquid fills said container to a level slightly above the line of the upper end portions of said partitions, said curving conduits being of relatively constricted sectional areas with respect to the sectional area of the passageway defined between said sloping bottom wall and said partitions, riffle means disposed transversely across the bottom portion of said horizontally disposed conduit for collection of heavy refuse materials thereon, means for periodically discharging said collected heavy refuse from said riffle means externally of the apparatus.

FREDERICK J. PAUL.